(12) United States Patent
White

(10) Patent No.: US 7,170,317 B2
(45) Date of Patent: Jan. 30, 2007

(54) SUM BIT GENERATION CIRCUIT

(75) Inventor: Benjamin Earle White, Warwick (GB)

(73) Assignee: Arithmatica Limited, Oxford (GB)

( * ) Notice: Subject to any disclaimer, the term of this patent is extended or adjusted under 35 U.S.C. 154(b) by 0 days.

(21) Appl. No.: 10/755,723

(22) Filed: Jan. 12, 2004

(65) Prior Publication Data

US 2004/0236814 A1 Nov. 25, 2004

Related U.S. Application Data

(60) Provisional application No. 60/473,204, filed on May 23, 2003.

(51) Int. Cl.
*G06F 7/50* (2006.01)

(52) U.S. Cl. ......................... 326/53; 708/702

(58) Field of Classification Search ............ 326/52–55, 326/113, 121; 708/700, 702
See application file for complete search history.

(56) References Cited

U.S. PATENT DOCUMENTS

| 3,634,658 | A | | 1/1972 | Brown |
|---|---|---|---|---|
| 3,757,098 | A | | 9/1973 | Wright |
| 3,843,876 | A | | 10/1974 | Fette et al. |
| 4,399,517 | A | | 8/1983 | Niehaus et al. |
| 4,463,344 | A | | 7/1984 | Adler et al. |
| 4,564,921 | A | * | 1/1986 | Suganuma ................. 708/702 |
| 4,592,007 | A | * | 5/1986 | Ohhashi ..................... 708/702 |
| 4,596,256 | A | | 6/1986 | Ascher et al. |
| 4,607,176 | A | | 8/1986 | Burrows et al. |
| 4,713,790 | A | | 12/1987 | Kloker et al. |
| 4,831,578 | A | | 5/1989 | Bui |
| 4,866,658 | A | * | 9/1989 | Mazin et al. ............... 708/702 |
| 4,870,609 | A | * | 9/1989 | Yasui et al. ................ 708/702 |
| 4,993,421 | A | | 2/1991 | Thornton |

(Continued)

FOREIGN PATENT DOCUMENTS

EP 0168650 A2 1/1986

(Continued)

OTHER PUBLICATIONS

"PCT international Search Report relating to PCT/GB 03/05489", (Sep. 15, 2004), 4 Pages.

(Continued)

*Primary Examiner*—Linh Nguyen
(74) *Attorney, Agent, or Firm*—Schwegman, Lundberg Woessner & Kluth P.A.

(57) ABSTRACT

Sum bit generation circuit includes first logic generating first signal as XOR of first and second input signals and second signal as the inverse of XOR of the first and second input signals; second logic receiving the first and second signals generated by first logic and generating an output signal as XOR of first signal and third input signal. Second logic includes at least two pass gates. First gate terminal of the first pass gate receives third input signal. A second gate terminal of the first pass gate receives the inverse of third input signal. First gate terminal of the second pass gate receives the inverse of the third input signal. Second gate terminal of the second pass gate receives the third input signal. Input terminals of the first and second pass gates receive the first signal and the second signal respectively. Pass gate output terminals generate the output signal.

22 Claims, 4 Drawing Sheets

U.S. PATENT DOCUMENTS

| | | | |
|---|---|---|---|
| 5,095,457 A | 3/1992 | Jeong | |
| 5,175,862 A | 12/1992 | Phelps et al. | |
| 5,187,679 A | 2/1993 | Vassiliadis et al. | |
| D341,423 S | 11/1993 | Bible | |
| 5,325,320 A | 6/1994 | Chiu | |
| 5,343,417 A | 8/1994 | Flora | |
| 5,343,418 A * | 8/1994 | Zinger | 708/702 |
| 5,363,099 A | 11/1994 | Allen | |
| 5,475,388 A | 12/1995 | Gormish et al. | |
| 5,497,342 A | 3/1996 | Mou et al. | |
| 5,524,082 A | 6/1996 | Horstmann et al. | |
| D377,983 S | 2/1997 | Sabri et al. | |
| 5,701,504 A | 12/1997 | Timko | |
| 5,712,792 A | 1/1998 | Yamashita et al. | |
| 5,717,622 A | 2/1998 | Kawamoto et al. | |
| 5,875,124 A * | 2/1999 | Takahashi | 708/702 |
| D407,159 S | 3/1999 | Roberg | |
| 5,943,250 A | 8/1999 | Kim et al. | |
| 5,964,827 A | 10/1999 | Ngo et al. | |
| 5,995,029 A | 11/1999 | Ryu | |
| 6,023,566 A | 2/2000 | Belkhale et al. | |
| 6,035,318 A | 3/2000 | Abdallah et al. | |
| 6,173,414 B1 | 1/2001 | Zumkehr et al. | |
| 6,175,852 B1 | 1/2001 | Dhong et al. | |
| 6,223,198 B1 | 4/2001 | Oberman et al. | |
| 6,269,386 B1 | 7/2001 | Siers et al. | |
| 6,353,843 B1 | 3/2002 | Chehrazi et al. | |
| 6,469,541 B2 * | 10/2002 | Tran et al. | 326/52 |
| 6,490,608 B1 | 12/2002 | Zhu | |
| 6,700,405 B1 * | 3/2004 | Hirairi | 326/53 |
| 2001/0010051 A1 | 7/2001 | Oberman et al. | |
| 2002/0026465 A1 | 2/2002 | Rumynin et al. | |
| 2002/0078110 A1 | 6/2002 | Rumynin et al. | |
| 2004/0153490 A1 | 8/2004 | Talwar et al. | |

FOREIGN PATENT DOCUMENTS

| | | |
|---|---|---|
| EP | 0309292 A2 | 3/1989 |
| EP | 0442356 A2 | 8/1991 |
| EP | 0741354 A2 | 11/1996 |
| FR | 2475250 | 8/1981 |
| GB | 2016181 | 9/1979 |
| GB | 2062310 | 5/1981 |
| GB | 2263002 | 7/1993 |
| GB | 2365636 | 2/2002 |
| GB | 2365637 | 2/2002 |
| JP | 8212057 | 8/1996 |
| WO | WO-99/22292 A1 | 5/1999 |
| WO | WO-02/12995 | 2/2002 |

OTHER PUBLICATIONS

"United Kingdom Search Report relating to Great Britain Patent Application No. GB0326611.1", (Mar. 29, 2004), 1 Page.

Bedrij, O. J., "Carry-Select Adder", *IRE Trans.*, EC-11, (Jun. 1962),340-346.

Booth, Andrew, "A Signed Binary Multiplication Technique", *Oxford University Press, Reprinted from Q.J. Mech. Appl. Math.* 4:236-240, (1951),pp. 100-104.

Chakraborty, S., et al., "Synthesis of Symmetric Functions for Path-Delay Fault Testability", *12th International Conference on VLSI Design*, (1999),pp. 512-517.

Dadda, L., "On Parallel Digital Multipliers", *Associazione Elettrontecnia ed Elettronica Italiana, Reprinted from Alta Freq.* 45:574-580, (1976),pp. 126-132.

Dadda, L., "Some Schemes for Parallel Multipliers", *Assocciazione Elettrotenica ed Elettronica Italiana, Reprinted from Alta Freq.* 34:349-356, (1965),pp. 118-125.

De Micheli, G., et al., "Optimal State Assignment for Finite State Machines", *IEEE Transactions on Computer-Aided Design*, vol. CAD-4 (3), (Jul. 1985),pp. 269-285.

Debnath, D., "Minimization of and-or-Exor Three-Level Networks with and Gate Sharing", *IEICE Trans. Inf. & Syst.*, E80-D, 10, (1997),pp. 1001-1008.

Drechsler, R., et al., "Sympathy: Fast Exact Minimization of Fixed Polarity Reed-Muller Expressions for Symmetric Functions", *IEEE ED&TC 1995, Proceedings European Design and Test Conference*, (Mar. 6-9, 1995),91-97.

Fleisher, H, "Combinatorial Techniques for Performing Arithmetic and Logical Operations", *IBM Research Center*, RC-289, *Research Report*, (Jul. 18, 1960),22 pages.

Flynn, M, et al., "Advanced Computer Arithmetic Design", *John Wiley & Sons 2001*, (2001),46-59.

Foster, Caxton, et al., "Counting Responders in an Associative Memory", *The Institute of Electrical and Electronics Engineers, Inc., Reprinted, with permission, from IEEE Trans. Comput.* C-20:1580-1583, (1971),pp. 86-89.

Goto, et al., "A 54×54-b Regularly Structured Tree Multiplier", *IEEE Journal of Solid-State Circuits*, vol. 27, No. 9, (Sep. 1992),1229-1236.

Hekstra, et al., "A Fast Parallel Multiplier Architecture", *IEEE International Symposium on Circuits and Systems; Institute of Electrical and Electronic Engineers*, c1977-c1996, 20v. :ill. :28cm, (1992),2128-2131.

Ho, I., et al., "Multiple Addition by Residue Threshold Functions and Their Representation By Array Logic", *The Institute of Electrical and Electronics Engineers, Inc., Reprinted, with permission from IEEE Trans. Comput.* C-22: 762-767, (1973),80-85.

Jones, Jr., Robert, et al., "Parallel Counter Implementation", *Conf. Rec. 26th Asilomar Conf. Signals, Systems & Computers*, 1, (1992),pp. 381-385.

Knowles, S., "A Family of Adders", *Proc. 14th IEEE Symp. on Computer Arithmetic*, (1999),30-34.

Koc, C, "High-Speed RSA Implementation", available at ftp://ftp.rsasecurity.com/pub/pdfs/tr201.pdf., Version 2.0,(Nov. 1994),73 pages.

Koc, C, "RSA Hardware Implementation", availabe at ftp://ftp.rsasecurity.com/pub/pdfs/tr801.pdf., Version 1.0,(Aug. 1995),30 pages.

Kogge, P. M., et al., "A Parallel Algorithm for the Efficient Solution of a General Class of Recurrence Equations", *IEEE Trans. Computers*, vol. C-22, No. 8, (Aug. 1973),786-793.

Ladner, Richard E., et al., "Parallel Prefix Computation", *Journal of ACM*, vol. 27, No. 4, (Oct. 1980),831-838.

Ling, Huey, "High-Speed Binary Adder", *IBM Journal of Research and Development*, vol. 25, No. 3, (1981),156-166.

Monteiro, J., et al., "Bitwise Encoding of Finite State Machines", *Proceedings of the 7th International Conference on VLSI Design*, (Jan. 1994),pp. 379-382.

Nicholson, J. O., "Parallel-Carry Adders Listing Two-Bit Covers", *IBM Technical Disclosure Bulletin*, 22(11), (Apr. 1980),5036-5037.

Nienhaus, H., Efficient Multiplexer Realizations of Symmetric Functions, *IEEE*, (1981),pp. 522-525.

Oklobdzija, V G., et al., "Improving multiplier design by using improved column compression tree and optimized final adder in CMOS technology", *IEEE Transactions on Very Large Scale Integration (VLSI) Systems*, IEEE, Inc, New York, vol. 3, No. 2,(1995),292-301.

Ong, S., et al., "A Comparision of ALU Structures for VLSI Technology", *Proceedings, 6th Symposium on Computer Arithmetic (IEEE)*, (1983),10-16.

Schmookler, M. S., et al., "Group-Carry Generator", *IBM Technical Disclosure Bulletin*, 6(1), (Jun. 1963),77-78.

Sklansky, J., "Conditional-Sum Addition Logic", *IRE Trans.*, EC-9, (Jun. 1960),226-231.

Swartzlander Jr., E E., "Parallel Counters", *IEEE Transactions on Computers*, C-22(11), (Nov. 1973),1021-1024.

Vassiliadis, S., et al., "7/2 Counters and Multiplication with Threshold Logic", *IEEE*, (1997),pp. 192-196.

Villa, Tiziano, et al., "NOVA: State Assignment of Finite State Machines for Optimal Two-Level Logic Implementation", *IEEE Transactions on Computer-Aided Design*, vol. 9, No. 9,(Sep. 1990),905-924.

Wallace, C., "A Suggestion for a Fast Multiplier", *IEEE Transactions on Electronic Computers*, vol. EC-13,(1964),pp. 14-17.

Weinberger, A., et al., "A Logic for High-Speed Addition", *Nat. Bur. Stand. Circ.*, 591, (1958),3-12.

Weinberger, A., "Extension of the Size of Group Carry Signals", *IBM Technical Disclosure Bulletin*, 22(4), (Sep. 1979),1548-1550.

Weinberger, A., "Improved Carry-Look-Ahead", *IBM Technical Disclosure Bulletin*, 21(6), (Nov. 1978),2460-2461.

Zuras, D, et al., "Balanced delay trees and combinatorial division in VLSI", *IEEE Journal of Solid State Circuits*, SC-21, IEEE Inc, New York, vol. SC-21, No. 5,(1986),814-819.

"United Kingdom Search Report relating to Great Britain Patent Application No. GB0400577.3", (May 21, 2004),1 Page.

Hashemian, R., "A Fast Carry Propagation Technique for Parallel Adders", *Proceedings of the 33rd Midwest Symposium on Circuits and Systems*, (1990),456-459.

"International Search Report and the Written Opinion, for Application No. PCT/GB2004/000059, Mailed Feb. 8, 2005.", 12 pages.

Zimmermann, Reto, "Low-Power Logic Styles: CMOS Versus Pass-Transistor Logic", *IEEE Journal of Solid-State Circuits*, 32(7), (Jul. 1997), 1079-1090.

Booth, Andrew, " A Signed Binary Multiplication Technique", *Oxford University Press, Reprinted from Q.J. Mech. Appl. Math.* 4:236-240, (1951),pp. 100-104, no month.

Chakraborty, S., et al., "Synthesis of Symmetric Functions for Path-Delay Fault Testability", *12th International Conference on VLSI Design*, (1999),pp. 512-517, no month.

Dadda, L., "On Parallel Digital Multipliers", *Associazione Elettrontecnia ed Elettronica Italiana, Reprinted from Alta Freq*, 45:574-580, (1976),pp. 126-132, no month.

Dadda, L., "Some Schemes for Parallel Multipliers", *Assocciazione Elettrotenica ed Elettronica Italiana, Reprinted from Alta Freq.* 34:349-356, (1965),pp. 118-125, no month.

De Micheli, G., et al., "Optimal State Assignment for Finite State Machines", *IEEE Transactions on Computer-Aided Design*, vol. CAD-4 (3), (Jul. 1985),pp. 269-285.

Debnath, D., "Minimization of and-or-Exor Three-Level Networks with and Gate Sharing", *IEICE Trans. Inf. & Syst.*, E80-D, 10, (1997),pp. 1001-1008, no month.

Flynn, M, et al., "Advanced Computer Arithmetic Design", *John Wiley & Sons 2001*, (2001),46-59, no month.

Foster, Caxton, et al., "Counting Responders in an Associative Memory", *The Institute of Electrical and Electronics Engineers, Inc., Reprinted, with permission, from IEEE Trans. Comput.* C-20:1580-1583, (1971),pp. 86-89, no month.

Hekstra, et al., "A Fast Parallel Multiplier Architecture", *IEEE International Symposium on Circuits and Systems; Institute of Electrical and Electronic Engineers*, c1977-c1996, 20v. :ill. :28cm, (1992),2128-2131, no month.

Ho, I., et al., "Multiple Addition by Residue Threshold Functions and Their Representation By Array Logic", *The Institute of Electrical and Electronics Engineers, Inc., Reprinted, with permission from IEEE Trans. Comput.* C-22: 762-767, (1973),80-85, no month.

Jones, Jr., Robert, et al., "Parallel Counter Implementation", *Conf. Rec. 26th Asilomar Conf. Signals, Systems & Computers*, 1, (1992),pp. 381-385, no month.

Knowles, S., "A Family of Adders", *Proc. 14th IEEE Symp. on Computer Arithmetic*, (1999),30-34, no month.

Ling, Huey, "High-Speed Binary Adder", *IBM Journal of Research and Development*, vol. 25, No. 3, (1981),156-166, no month.

Nienhaus, H., "Efficient Multiplexer Realizations of Symmetric Funcitons, *IEEE*, (1981),pp. 522-525, no month.

Oklobdzija, V G., et al., "Improving multiplier design by using improved column compression tree and optimized final adder in CMOS technology", *IEEE Transactions on Very Large Scale Integration (VLSI) Systems*, IEEE, Inc, New York, vol. 3, No. 2,(1995),292-301, no month.

Ong, S., et al., "A Comparision of ALU Structures for VLSI Technology", *Proceedings, 6th Symposium on Computer Arithmetic (IEEE)*, (1983),10-16, no month.

Vassiliadis, S., et al., "7/2 Counters and Multiplication with Threshold Logic", *IEEE*, (1997),pp. 192-196, no month.

Wallace, C., "A Suggestion for a Fast Multiplier", *IEEE Transactions on Electronic Computers*, vol. EC-13,(1964),pp. 14-17, no month.

Weinberger, A., et al., "A Logic for High-Speed Addition", *Nat. Bur. Stand. Circ.*, 591, (1958),3-12, no month.

Zuras, D, et al., "Balanced delay trees and combinatorial division in VLSI", *IEEE Journal of Solid State Circuits*, SC-21, IEEE Inc, New York, vol. SC-21, No. 5,(1986),814-819, no month.

Hashemian, R., "A Fast Carry Propagation Technique for Parallel Adders", *Proceedings of the 33rd Midwest Symposium on Circuits and Systems*, (1990),456-459, no month.

\* cited by examiner

SUM BIT GENERATION CIRCUIT

RELATED APPLICATIONS

This application claims priority from U.S. Provisional Patent Application No. 60/473,204, filed on May 23, 2003, which application is incorporated herein by reference.

FIELD OF THE INVENTION

The present invention relates to digital electronic devices, and in particular, to a digital electronic device performing binary logic.

BACKGROUND OF THE INVENTION

In many applications in binary arithmetic, one requires a device, called a full adder (FA), which receives three digital signals and then computes the binary representation of the number of high signals among the three signals. Further, it is often advantageous to design the device so that the delay in the computation is much smaller for one of the three signals than for the other two. This is typically achieved by performing the computation in two stages, the first involving only two of the signals, the second involving the third signal and the result of the first stage. We refer to the third signal as the carry-in.

In one implementation of the device pass-gates are used, as these are typically faster than standard CMOS gates. When designing the circuit to conform to a standard-cell methodology, however, pass-gates pose one disadvantage: A FA standard cell must be characterisable, which is to say that it must have a well defined input capacitance and output impedance. On their own, pass-gates are not characterisable; two of the input/output pins, corresponding to the source and drain terminals of the pass-gate, do not have a well defined input capacitance. As a result, these pins are not normally permitted to be connected directly to the input/output pins of the standard cell. This constraint often results in a design which is not as fast as it might be.

The following notation is used for logical operations on Boolean variables (such that take one of two values, high and low):

a b denotes the AND of a and b, which is high if a and b are high.

a+b denotes the OR of a and b, which is high if a is high or b is high.

a⊕b denotes the exclusive OR of a and b, which is high if a and b have different values.

a-bar is the complement of a, which is high if a is low.

$\Sigma_{i=a\ i=b}$ S(i) denotes the OR of a plurality of Boolean expressions, i.e. S(a)+S(a+1)+ . . . +S(b).

A prior-art FA circuit, at the level of Boolean logic, is shown in FIG. 1. This is an efficient way to build a FA with a fast carry-in (CIN). The circuit has three inputs, A, B and CIN, and two outputs S and C.

Output S represents a sum bit in the addition of A, B and CIN, and S is the logical XOR of inputs A, B and CIN, i.e. S=A⊕B⊕CIN. S is high if an odd number of A, B and CIN are high and is low if an even number are high.

Output C represents an output carry bit from the addition of A, B and CIN. C is high if at least two of A, B and CIN are high, otherwise C is low.

The circuit comprises an XOR gate 100 with inputs A and B and an output A⊕B. A second XOR gate 110 has inputs A⊕B (from the first XOR gate 100) and CIN, and an output S. A multiplexer (mux) 120 has A⊕B as a select input, B (or equivalently A) as a "0" input, and CIN as a "1" input and gives C as an output. C is equal to A if A⊕B is low; C is equal to CIN if A⊕B is high.

A prior-art implementation of the circuit of FIG. 1, using pass-gates, is shown in FIG. 2. Again, the circuit has inputs A and B, a carry input CIN, a carry output C and a sum output S.

The first XOR gate 100 is implemented using pass gates 204, 205, 206 and 207. These pass gates actually work in pairs to form two XOR gates, one of which generates A⊕B using pass gates 206 and 207, and the other of which generates the complement of A⊕B using pass gates 204 and 205. The second XOR gate 110 is implemented using pass gates 215 and 216. The multiplexer 120 is implemented using pass gates 213 and 214.

Input A is connected to the input of an inverter 202. The output of this inverter 202 is connected to the source terminal of pass gates 204 and 207. The output of inverter 202 is also connected to the input of a further inverter 203. The output of inverter 203 is connected to the source terminal of pass gates 205 and 206.

Input B is connected directly to the gate terminals of pass gates 205 and 207, and to the inverse gate terminals of pass gates 204 and 206. Input B is also connected to the input of inverter 201. The output of inverter 201 is connected to the gate terminals of pass gates 204 and 206, and to the inverse gate terminals of pass gates 205 and 207. The output of inverter 201 is also connected to the source terminal of pass gate 214.

Pass gates 206 and 207 and inverters 201, 202 and 203 function as an XOR gate, to generate the function A⊕B. The drain outputs of pass gates 206 and 207 are connected together to give a A⊕B output.

Only one of pass gates 206 and 207 is switched on at the same time, because pass gate 206 receives the opposite control signal on its gate terminals to that received by pass gate 207, due to the order of connection of the B input and the inverted B input to the gate terminals. Pass gate 206 is switched on only if B is low, but pass gate 207 is switched on only if B is high. Thus, if B is low, the signal passed by pass gate 206 is from the A input, but if B is high, the signal passed by pass gate 207 is from the inverted A input. By this means, the XOR function is performed.

Pass gates 204 and 205 and inverters 201, 202 and 203 also function as an XOR gate, but they generate the complement of the function A⊕B. The drain outputs of pass gates 204 and 205 are connected together to give a (A⊕B)-bar output, represented on the figure as AxorBbar.

Only one of pass gates 204 and 205 is switched on at the same time, because pass gate 204 receives the opposite control signal on its gate terminals to that received by pass gate 205, due to the order of connection of the B input and the inverted B input to the gate terminals. Pass gate 204 is switched on only if B is low, but pass gate 205 is switched on only if B is high. Thus, if B is low, the signal passed by pass gate 204 is from the inverted A input, but if B is high, the signal passed by pass gate 205 is from the A input.

The drain outputs of pass gates 206 and 207 are connected to the gate terminals of pass gates 213 and 215 and the inverse gate terminals of pass gates 214 and 216, providing the A⊕B signal at these terminals. The drain outputs of pass gates 204 and 205 are connected to the gate terminals of pass gates 214 and 216 and the inverse gate terminals of pass gates 213 and 215, providing the (A⊕B)-bar signal at these terminals.

The carry input CIN is connected to the input terminal of inverter 211. The output of inverter 211 is connected to the source inputs of pass gates 213 and 216. The output of inverter 211 is also connected to the input of inverter 212. The output of inverter 212 is connected to the source input of pass gate 215. The source input of pass gate 214 is connected to the output of inverter 201, to receive a signal of not-B.

The pass gates 215 and 216 act together as an XOR gate to generate an output sum bit S. The drain outputs of pass gates 215 and 216 are connected together, and are connected to the input of inverter 218.

The pass gates 215 and 216 are switched by the A⊕B and (A⊕B)-bar outputs of the pass gates 204–207 in the first part of the circuit. When A⊕B is high, pass gate 215 is switched on, and the CIN signal is passed through to inverter 218, where it is inverted to generate not-CIN. When A⊕B is low, pass gate 216 is switched on, and the not-CIN signal is passed through to inverter 218, where it is inverted to generate not-CIN. In other words, the sum bit S is only high if only one of A, B and CIN, or all three of A, B and CIN is high.

The pass gates 213 and 214 act together as a multiplexer to generate a carry output bit C. The drain outputs of pass gates 213 and 214 are connected together, and are connected to the input of inverter 217.

The pass gates 213 and 214 are switched by the A⊕B and (A⊕B)-bar outputs of the pass gates 204–207 in the first part of the circuit. When A⊕B is high, pass gate 213 is switched on, and the not-CIN signal is passed through to inverter 217, where it is inverted to generate CIN. When A⊕B is low, pass gate 214 is switched on, and the not-B signal is passed through to inverter 217, where it is inverted to generate B. In other words, the carry output bit C is only high if at least two of A, B and CIN are high.

Since the implementation conforms to the standard-cell methodology, no pass-gate source or drain connection is connected to either an input pin or an output pin. As a result, the critical path from CIN to the outputs, along which signals take the longest time to propagate, passes through a total of three inverters 211, 212 and 218 and a pass-gate 215.

SUMMARY OF THE INVENTION

The present invention provides a circuit for generating a sum bit representing the least significant bit in the sum of three binary input signals. The three inputs may consist of a first and second binary input and a carry in input. The circuit may also generate a carry out bit, representing the most significant bit in the sum of the three binary input signals.

The circuit generates a first and a second intermediate signal using a first set of logic elements. These intermediate signals correspond to the logical XOR of the first and second inputs, and to the inverse of the logical XOR of the first and second inputs respectively.

The circuit then generates the sum bit using a second set of logic elements, which includes two pass gates. The first and second intermediate signals are used as inputs to each of the two pass gates respectively. The third input signal and its inverse are used as pass gate control inputs, where the order of connection of the third input signal and its inverse to the first pass gate control inputs is the opposite to that for the second pass gate control inputs, such that only one of the two pass gates can be open at any one time. The pass gates are connected in a configuration which generates a logical XOR of the third input signal and the first or second intermediate signal. The outputs of the two pass gates are connected together, and may be connected to an output inverter, to generate the sum output bit. The advantage of connecting the output via an output inverter is that it ensures a low output impedance, which is important if the circuit is used in a standard cell.

The first set of logic elements may include a pair of high input impedance buffer components, with one buffer component being arranged to output the first intermediate signal, and the other buffer component being arranged to output the second intermediate signal. The buffer components may be any components which transfer the signal, but also provide a low output impedance. The buffer components may be inverters, transferring the inverted signal and providing a low output impedance. If inverters are used as buffer components, it is possible to simply interchange the connections providing the first and second intermediate signals respectively, to compensate for each signal being inverted.

The first set of logic elements may include pass gates for generating the logical XOR of the first and second inputs as the first intermediate signal. Alternatively, or additionally, a set of pass gates may be provided for generating the logical XNOR of the first and second inputs as the second intermediate signal. If only one set of pass gates is provided, the other intermediate signal may be generated using an inverter and the output of the set of pass gates.

The circuit may include a third set of logic elements to generate an output carry bit. The third set of logic elements may be a set of pass gates which is configured to function as a multiplexer. The first and/or second intermediate signals may be used to switch the multiplexer. The multiplexer inputs may be the third input signal or its inverse, and the first or second input signal or its inverse. The multiplexer inputs may be isolated from the source terminals of all other pass gates to prevent unwanted capacitance effects from slowing down the circuit.

Preferred embodiments of the invention provide an alternative implementation of a fast adder to that known in the prior art. Preferred embodiments of the invention conform to the standard-cell methodology, where no pass-gate source connection is connected to an input pin. Furthermore, preferred embodiments conforming to the standard-cell methodology may also have no pass gate drain connection connected to an output pin. However, the present invention is not limited to such a technology or design.

Further aspects of the present invention include a circuit board comprising the circuit described in the claims, a standard cell comprising the circuit described in the claims, and an adder for adding together two multi-bit binary numbers, using a circuit as described in the claims.

BRIEF DESCRIPTION OF THE DRAWINGS

FIG. 3 is a circuit diagram corresponding to a first embodiment of the present invention, which provides modifications to the prior art circuit of FIG. 2. Again, the circuit has inputs A and B, a carry input CIN, a carry output C and a sum output S.

DETAILED DESCRIPTION OF EMBODIMENTS OF THE INVENTION

Figure 3:
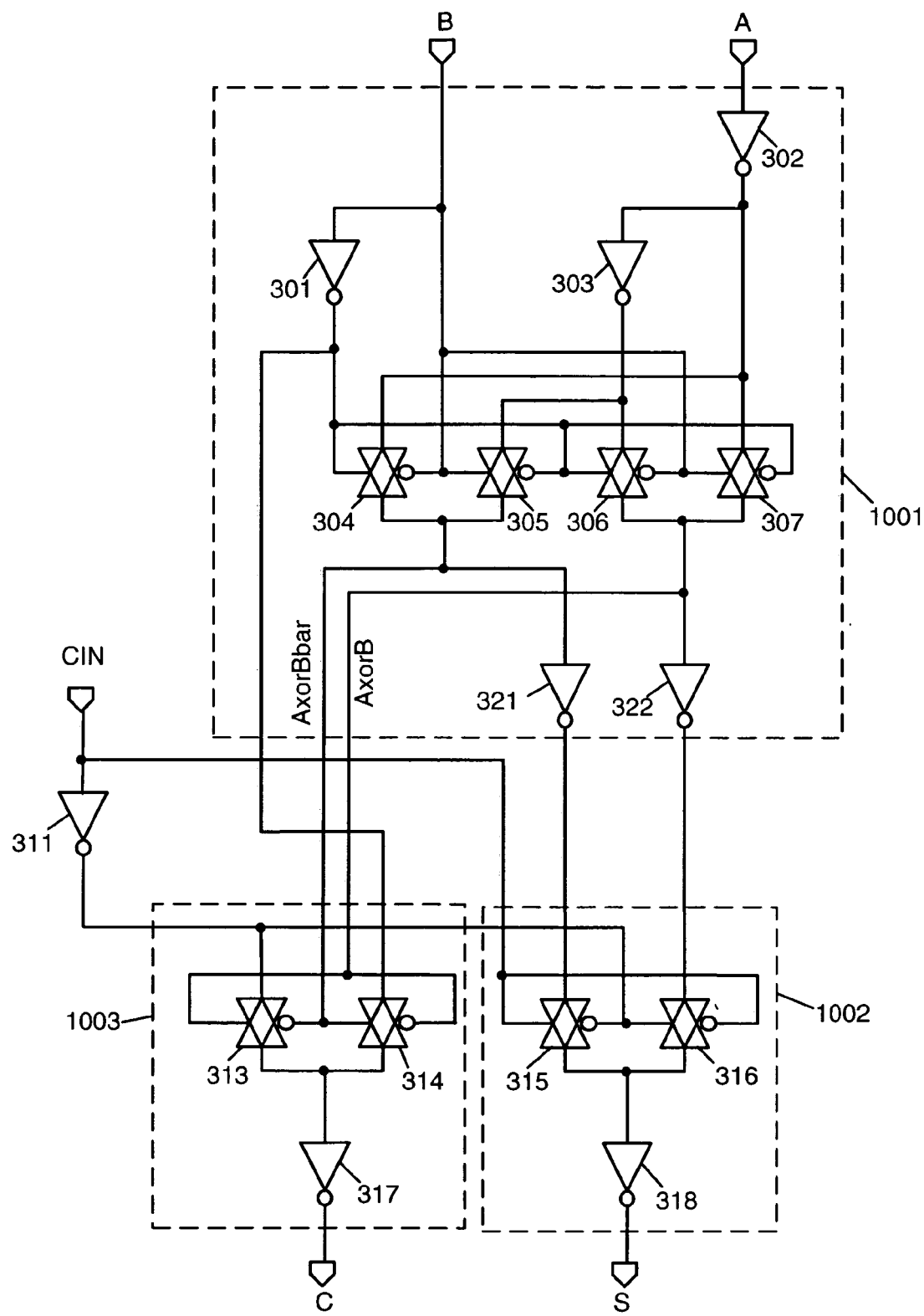
FIG. 3 is a circuit diagram showing a first embodiment of the invention.

The circuit of FIG. 3 has modifications to reduce the delay from the carry-in to the outputs, but retain a characterisable circuit, with well defined input capacitance and output impedence. The circuit comprises a first subcircuit 1001, a second subcircuit 1002 and a third subcircuit 1003.

The first modification is that the XOR gate that produces the signal S is implemented so that the CIN signal is connected to the pass-gate mux's select inputs. This means that two inverters are no longer required just after the CIN input.

The second modification is that two inverters are added to buffer the signals A⊕B and (A⊕B)-bar. The inverters' outputs are connect only to the multiplexer producing the S output. These speed up any transitions on S caused by CIN.

Figure 1:
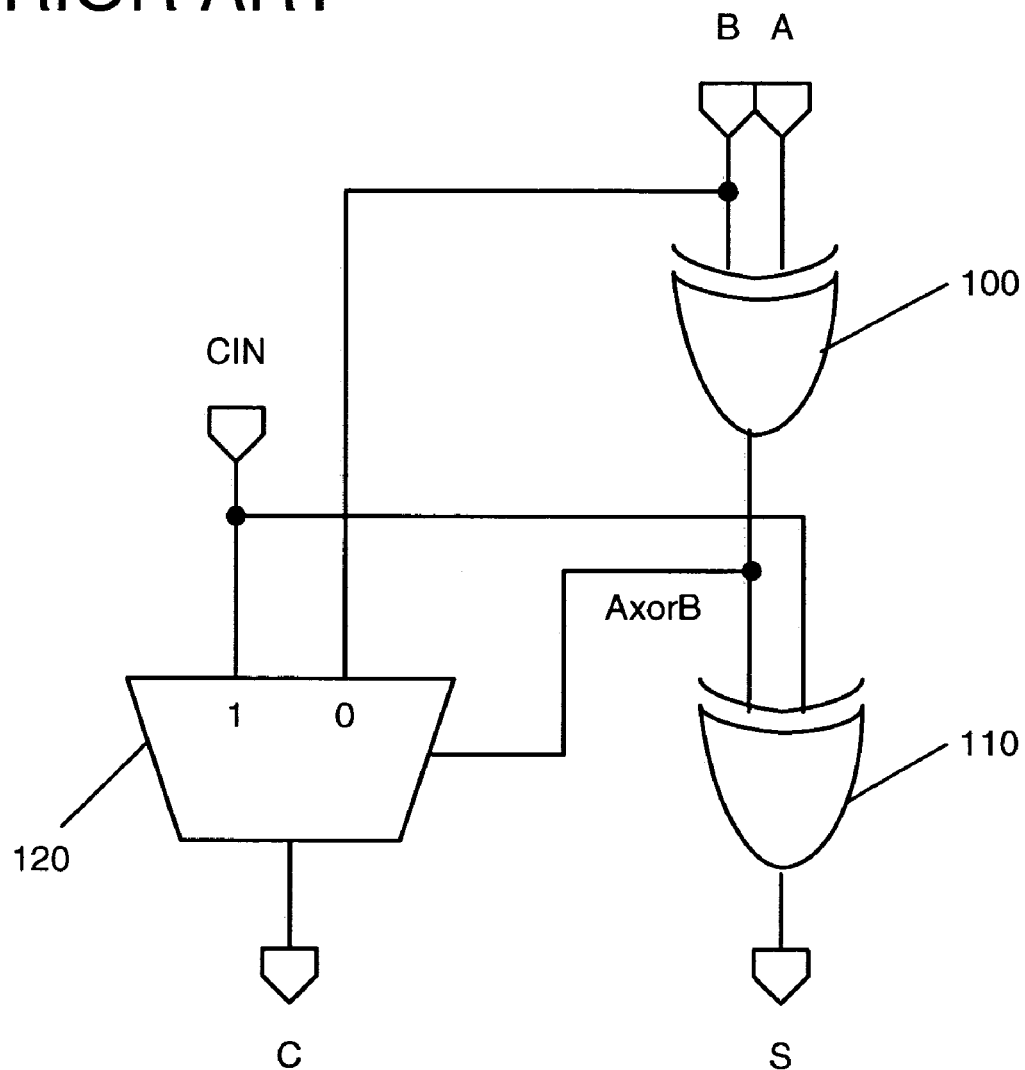
FIG. 1 is a circuit diagram showing a gate-level implementation of a full adder with fast carry-in, as known in the prior art.
Figure 2:
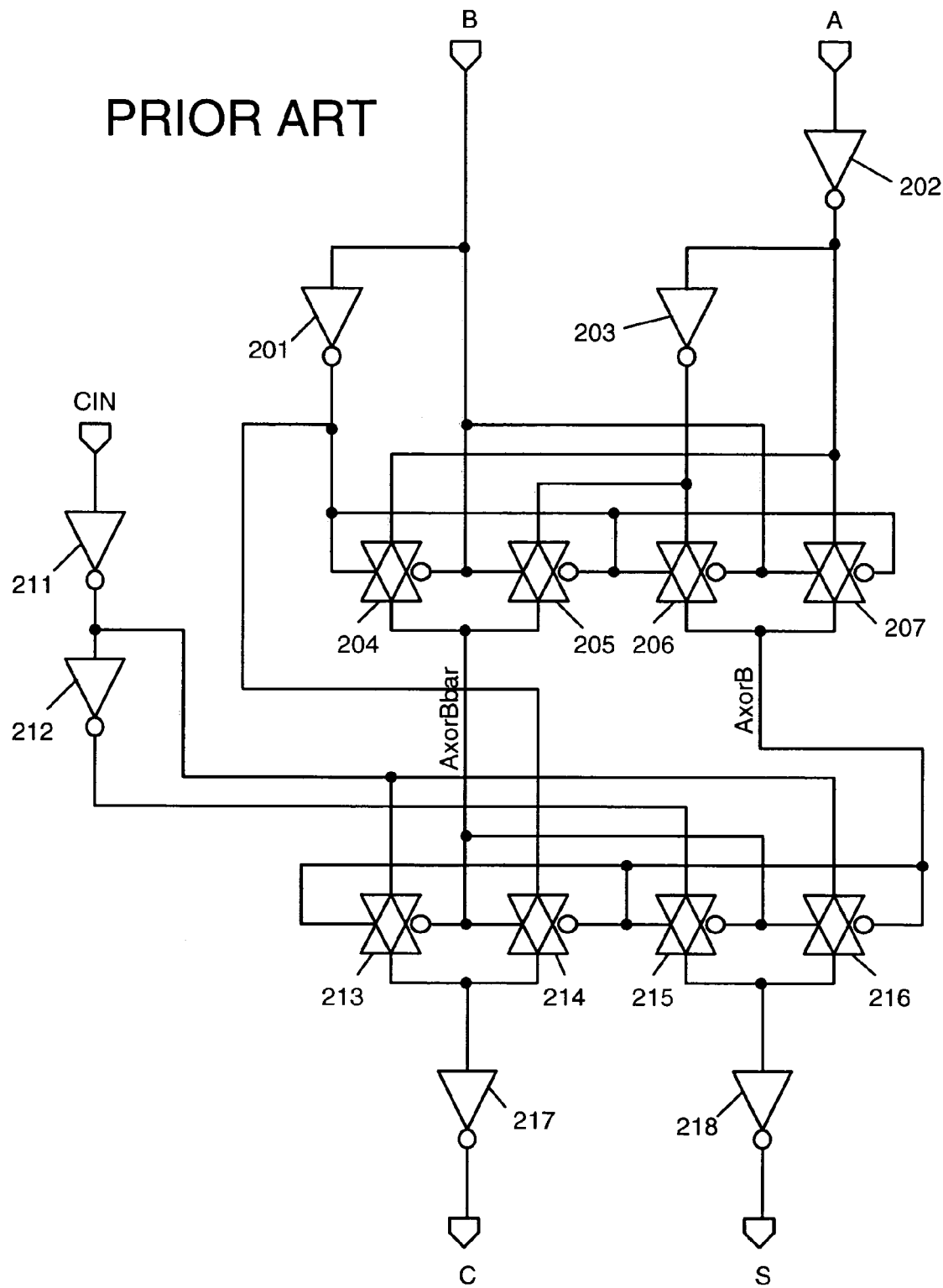
FIG. 2 is a circuit diagram showing a prior-art implementation of a fast adder using inverters and pass-gates.

The critical path from CIN to the output of the embodiment of the present invention passes through a total of two inverters and one pass-gate. This represents a saving of one inverter compared with the implementation in FIG. 2.

The first subcircuit comprises inverters 301, 302, 303, 321 and 322 and pass gates 304, 305, 306 and 307. A first binary input A is connected to the input of the inverter 302. The output of this inverter 302 is connected to the source terminal of pass gates 304 and 307. The output of inverter 302 is also connected to the input of inverter 303. The output of inverter 303 is connected to the source terminal of pass gates 305 and 306.

A second binary input B is connected directly to the gate terminals of pass gates 305 and 307, and to the inverse gate terminals of pass gates 304 and 306. Input B is also connected to the input of inverter 301. The output of inverter 301 is connected to the gate terminals of pass gates 304 and 306, and to the inverse gate terminals of pass gates 305 and 307. The output of inverter 301 is also connected to the source terminal of pass gate 314.

Pass gates 306 and 307 and inverters 301, 302 and 303 function as an XOR gate, to generate the function A⊕B. The drain outputs of pass gates 306 and 307 are connected together to give a A⊕B output.

Only one of pass gates 306 and 307 is switched on at the same time, because pass gate 306 receives the opposite control signal on its gate terminals to that received by pass gate 307, due to the order of connection of B and not-B to the gate terminals. Pass gate 306 is switched on only if B is low, but pass gate 307 is switched on only if B is high. Thus, if B is low, the signal passed by pass gate 306 is A, but if B is high, the signal passed by pass gate 307 is not-A. By this means, the XOR function is performed.

Pass gates 304 and 305 and inverters 301, 302 and 303 also function as an XOR gate, but they generate the complement of the function A⊕B. The drain outputs of pass gates 304 and 305 are connected together to give a (A⊕B)-bar output, represented on the figure as AxorBbar.

Only one of pass gates 304 and 305 is switched on at the same time, because pass gate 304 receives the opposite control signal on its gate terminals to that received by pass gate 305, due to the order of connection of B and not-B to the gate terminals. Pass gate 304 is switched on only if B is low, but pass gate 305 is switched on only if B is high. Thus, if B is low, the signal passed by pass gate 304 is not-A, but if B is high, the signal passed by pass gate 305 is A.

The outputs of the pass gates 306 and 307 are input to an inverter 322 acting as a high impedence buffer to generate an (A⊕B)-bar output. Similarly, the outputs of the pass gates 304 and 305 are input to an inverter 321 to generate an A⊕B output. The outputs of the inverters 321 and 322 comprise the outputs of the first subcircuit 1001.

The carry input CIN is connected to the input terminal of an inverter 311. The output of the inverter 311 is connected to the source input of a pass gate 313 in the third subcircuit 1003, to the inverse gate input of a pass gate 315 and to the gate input of a pass gate 316 in the second subcircuit 1002. The carry input CIN is directly connected to the gate input of pass gate 315 and to the inverse gate input of pass gate 316 of the second subcircuit 1002. The source input of pass gate 314 in the third subcircuit 1003 is connected to the output of inverter 301, which gives a signal of not-B.

The pass gates 315 and 316 of the second subcircuit 1002 act together as an XOR gate to generate an output sum bit S. The drain outputs of pass gates 315 and 316 are connected together, and are connected to the input of inverter 318.

The pass gates 315 and 316 are switched by the CIN input, and its complement CIN-bar. When CIN is high, pass gate 315 is switched on, and the A⊕B signal is passed through to inverter 318, where it is inverted to generate (A⊕B)-bar. When CIN is low, pass gate 316 is switched on, and the (A⊕B)-bar signal is passed through to inverter 318, where it is inverted to generate A⊕B. In other words, the sum bit S is only high if only one of A, B and CIN, or all three of A, B and CIN is high.

The pass gates 313 and 314 of the third subcircuit 1003 act together to generate the carry output bit C. The drain outputs of pass gates 313 and 314 are connected together, and are connected to the input of inverter 317.

The pass gates 313 and 314 are switched by the A⊕B and (A⊕B)-bar outputs of the pass gates 304–307 in the first part of the circuit. When A⊕B is high, pass gate 313 is switched on, and the CIN-bar signal is passed through to inverter 317, where it is inverted to generate CIN. When A⊕B is low, pass gate 314 is switched on, and the B-bar signal is passed through to inverter 317, where it is inverted to generate B. The circuit would work equally well if the A-bar signal was used in place of the B-bar signal. In other words, the carry output bit C is only high if at least two of A, B and CIN are high.

Figure 4:
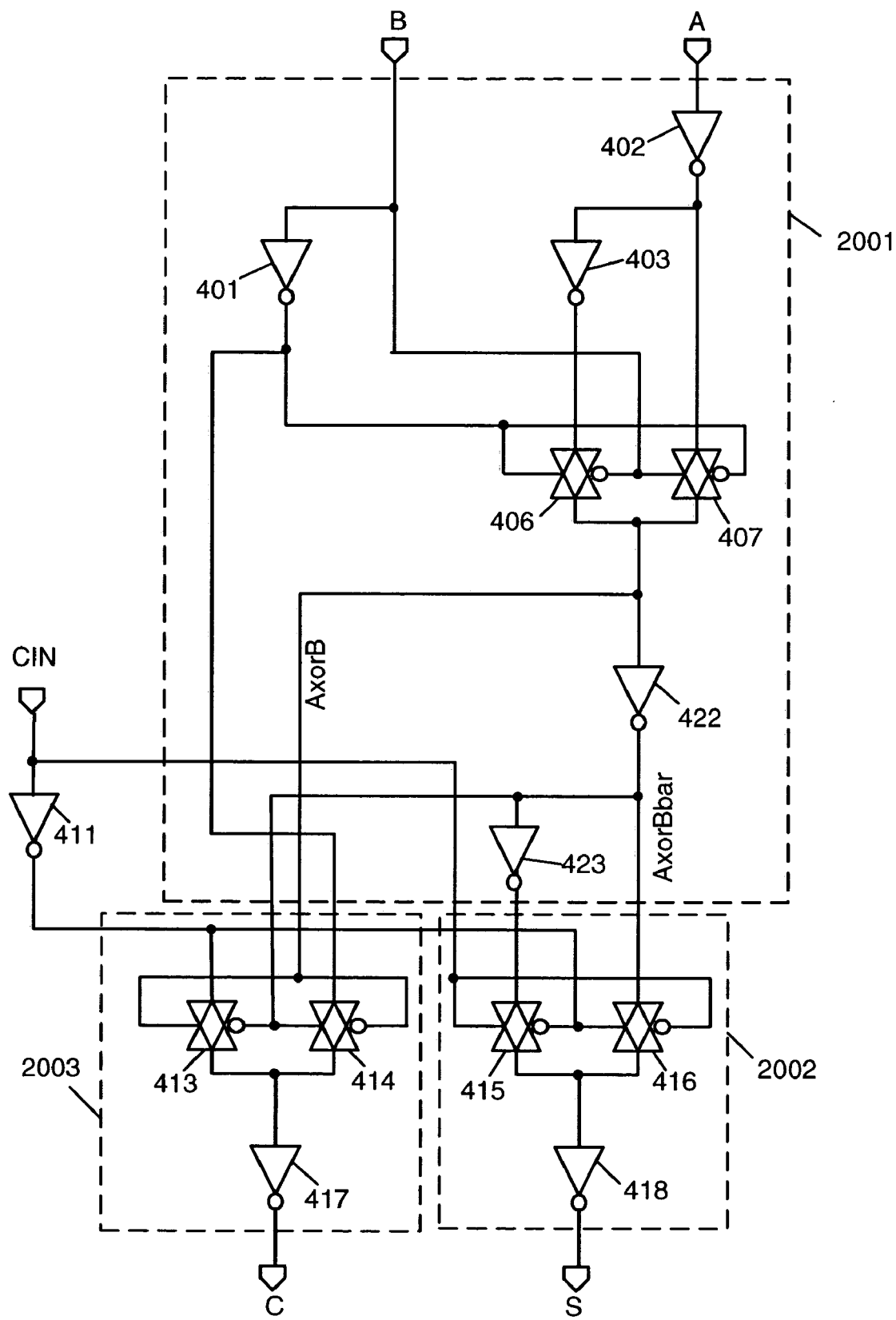
FIG. 4 is a circuit diagram showing a second embodiment of the invention.

FIG. 4 is a circuit diagram corresponding to a second embodiment of the invention. In this second embodiment, the second and third subcircuits 2002 and 2003 are the same as those of the first embodiment shown in FIG. 3. However, in the second embodiment, the first subcircuit 2001 has only one pair of pass gates 406, 407. These pass gates are used to generate A⊕B. In order to generate (A⊕B)-bar, the outputs from the pass gates 406, 407 are connected to the input of an inverter 422, and the inverter 422 outputs the (A⊕B)-bar signal.

The output of inverter 422 is fed to the source terminal of pass gate 416 to allow the sum output bit to be generated. The output of inverter 422 is also fed to the inverse gate terminal of pass gate 413 and to the gate terminal of pass gate 414 to allow the carry output bit to be generated.

The A⊕B signal generated as the output of the pass gates 406 and 407 is suitable for directly controlling the gate terminal of a further pass gate. However, for controlling the source terminal of a further pass gate, it may be advantageous to use at least one intermediate inverter, to present a lower output impedence to the source terminal. Therefore, in FIG. 4, a further inverter 423 is provided. The output of inverter 422 is fed into the input of inverter 423 to generate a further signal corresponding to A⊕B. The output of inverter 423 is then fed into the source terminal of pass gate 415.

The embodiment of FIG. 4 has an extra inverter 423 in the path to generate a A⊕B signal. Where CIN is a carry bit that takes longer to generate than either A or B, any small reduction in the speed of generating A⊕B, due to this extra inverter, may not be critical. The embodiment of FIG. 4 has the advantage that by omitting pass gates 404 and 405, the amount of area needed for the circuit is less than that for the circuit of FIG. 3.

The circuits according to the present invention may be used for the addition of any three binary numbers, and may be used in any device which has a need to add three binary numbers together. It is not essential that the third input signal is specially selected, e.g. a carry input. Any binary input signal can be used as either the first, second or third input signal.

However, in order to take advantage of the reduced critical path for the third input signal, the third input signal may be chosen as a signal which takes longer to generate than either the first or the second input signal. The first and second signals may result from a faster calculation process than the third signal. For example, a piece of hardware may have three detectors, each generating a signal to be added, but where one of the signals requires more processing than the other two signals. This signal needing more processing may be used for the third input signal of the circuit.

In some applications adding three independent bits together, further provision may need to be made to deal with any carry bits arising during the addition. Standard methods known to a person skilled in the art may be used to deal with such carry bits.

Although other uses of the invention are possible, a major application of the invention is for an adder with fast carry-in. In this application, the first and second input signals correspond to individual bits to be added during a sum of two multi-bit numbers, and the third input signal may correspond to a carry input bit, generated by the previous column of the sum.

Embodiments of the present invention are suitable for standard cell technology in which the inputs and outputs have fixed input capacitance. The use of high input impedence devices such as inverters at the inputs and outputs of the pass gates facilities this.

The present application includes a circuit for generating a sum bit representing the sum of three binary input signals; the circuit comprising: first logic arranged to generate a first intermediate signal as the logical XOR of the first and second binary input signals and a second intermediate signal as the inverse of the logical XOR of the first and second binary input signals; and second logic arranged to receive said first and second intermediate signals generated by said first logic, and to generate an output signal as the logical XOR of the first intermediate signal and the third binary input signal, said second logic comprising at least two pass gates, wherein: a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal; input terminals of the first and second pass gates are connected to receive the first intermediate signal and the second intermediate signal respectively; and output terminals of said pass gates are used to generate said output signal.

While the invention has been described in terms of what are at present its preferred embodiments, it will be apparent to those skilled in the art that various changes can be made to the preferred embodiments without departing from the scope of the invention, which is defined by the claims.

What is claimed is:

1. A circuit for generating a sum bit representing the sum of three binary input signals; the circuit comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
   a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
   input terminals of the first and second pass gates are connected to receive the first intermediate signal and the second intermediate signal respectively;
   output terminals of said pass gates are used to generate said output signal,
   wherein said first logic includes a first pair of pass gates for use in the generation of said first intermediate signal and a second pair of pass gates for use in the generation of said second intermediate signal; and
   each said pass gate includes a gate terminal and an inverse gate terminal.

2. A circuit as claimed in claim 1, wherein the first logic includes a pair of high input impedence buffer components, a first of said buffer components being arranged to output the first intermediate signal, and a second of said buffer components being arranged to output the second intermediate signal.

3. A circuit as claimed in claim 2, wherein each of said high impedence buffer components comprises an inverter.

4. A circuit as claimed in claim 1, wherein said first logic includes a first inverter for inverting combined outputs of said first pair of pass gates to generate said first intermediate output, and a second inverter for inverting combined outputs of the second pair of pass gates to generate said second intermediate output.

5. A circuit as claimed in claim 1, wherein said second logic comprises at least one inverter connected to said output terminals to generate said output signal.

6. A circuit as claimed in claim 1, wherein said three inputs signals comprise first and second addition bits and a carry-in bit.

7. A circuit for generating a sum bit representing the sum of three binary input signals; the circuit comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
   a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
   input terminals of the first and second pass gates are connected to receive the first intermediate signal and the second intermediate signal respectively;
   output terminals of said pass gates are used to generate said output signal,
   wherein said first logic includes a first pair of pass gates for use in the generation of said first intermediate signal and a second pair of pass gates for use in the generation of said second intermediate signal; and
   further comprising third logic to generate an output carry bit using the inverse of said third binary input signal and at least one of the first and second intermediate signals.

8. A circuit as claimed in claim 7, wherein the third logic comprises a pair of pass gates.

9. A circuit as claimed in claim 8, wherein said third logic comprises at least one inverter connected to output terminals of said pass gates of the third logic to generate said output signal.

10. A circuit as claimed in claim 9, wherein the inverse of the third binary input is connected to an input terminal of one of the pass gates of the third logic, and wherein said input terminal of said one of the pass gates of the third logic is isolated from the input terminals of all other said pass gates.

11. A circuit as claimed in claim 8, wherein the inverse of the third binary input is connected to an input terminal of one of the pass gates of the third logic, and wherein said input terminal of said one of the pass gates of the third logic is isolated from the input terminals of all other said pass gates.

12. The circuit of claim 7, wherein each said pass gate includes a gate terminal and an inverse gate terminal.

13. An adder circuit for adding together two multi-bit binary numbers, comprising a plurality of circuits for generating a sum bit representing the sum of three binary input signals; each of the plurality of circuits comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
      a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
      input terminals of the first and second pass gates are connected to receive the first intermediate signal and the second intermediate signal respectively;
      output terminals of said pass gates are used to generate said output signal,
   wherein said first logic includes a first pair of pass gates for use in the generation of said first intermediate signal and a second pair of pass gates for use in the generation of said second intermediate signal; and
   each said pass gate includes a gate terminal and an inverse gate terminal.

14. The adder circuit of claim 13, wherein the first logic includes a pair of high input impedance buffer components, a first of said buffer components being arranged to output the first intermediate signal, and a second of said buffer components being arranged to output the second intermediate signal.

15. The adder circuit of claim 14, wherein each of said high impedance buffer components comprises an inverter.

16. The adder circuit of claim 13, wherein said first logic includes a first inverter for inverting combined outputs of said first pair of pass gates to generate said first intermediate output, and a second inverter for inverting combined outputs of the second pair of pass gates to generate said second intermediate output.

17. The adder circuit of claim 13, wherein said second logic comprises at least one inverter connected to said output terminals to generate said output signal.

18. A standard cell comprising a circuit for generating a sum bit representing the sum of three binary input signals; the circuit comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
      a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
      input terminals of the first and second pass gates are connected to receive the first intermediate signal and the second intermediate signal respectively;
      output terminals of said pass gates are used to generate said output signal,
   wherein said first logic includes a first pair of pass gates for use in the generation of said first intermediate signal and a second pair of pass gates for use in the generation of said second intermediate signal; and
   wherein each said pass gate includes gate terminal and an inverse gate terminal.

19. A circuit board comprising a plurality of the circuits for generating a sum bit representing the sum of three binary input signals; each of the plurality of circuits comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
      a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
      input terminals of the first and second pass gates are connected to receive the first intermediate signal and the second intermediate signal respectively;
      output terminals of said pass gates are used to generate said output signal,
   wherein said first logic includes a first pair of pass gates for use in the generation of said first intermediate signal and a second pair of pass gates for use in the generation of said second intermediate signal; and
   each said pass gate includes a gate terminal and an inverse gate terminal.

20. An adder circuit for adding together two multi-bit binary numbers, comprising a plurality of circuits for generating a sum bit representing the sum of three binary input signals; each of the plurality of circuits comprising:
   first logic arranged to generate a first intermediate signal as the logical XOR of the first and second binary input signals and a second intermediate signal as the inverse of the logical XOR of the first and second binary input signals; and
   second logic arranged to receive said first and second intermediate signals generated by said first logic, and to generate an output signal as the logical XOR of the first intermediate signal and the third binary input signal, said second logic comprising at least two pass gates, wherein:
      a first gate terminal of a first of said pass gates is arranged to receive the third binary input signal, a second gate terminal of said first pass gate is arranged to receive the inverse of the third binary input signal, a first gate terminal of a second of said pass gates is arranged to receive the inverse of the third binary input signal, and a second gate terminal of said second pass gate is arranged to receive the third binary input signal;
      input terminals of the first and second pass gates are connected to receive the first intermediate signal and the second intermediate signal respectively;
      output terminals of said pass gates are used to generate said output signal,
   wherein said first logic includes a first pair of pass gates for use in the generation of said first intermediate signal and a second pair of pass gates for use in the generation of said second intermediate signal; and
   further comprising third logic to generate an output carry bit using the inverse of said third binary input signal and at least one of the first and second intermediate signals.

21. The adder circuit of claim 20, wherein the third logic comprises a pair of pass gates.

22. The adder circuit of claim 20, wherein each said pass gate includes a gate terminal and an inverse gate terminal.

* * * * *